(12) United States Patent
Neuper

(10) Patent No.: US 8,919,792 B2
(45) Date of Patent: Dec. 30, 2014

(54) TRANSPORT CART

(75) Inventor: Karl Neuper, Roethis (AT)

(73) Assignee: Hilti Aktiengesellschaft, Schaan (LI)

( * ) Notice: Subject to any disclaimer, the term of this patent is extended or adjusted under 35 U.S.C. 154(b) by 14 days.

(21) Appl. No.: 13/510,147

(22) PCT Filed: Nov. 9, 2010

(86) PCT No.: PCT/EP2010/067126
§ 371 (c)(1),
(2), (4) Date: Jul. 5, 2012

(87) PCT Pub. No.: WO2011/058013
PCT Pub. Date: May 19, 2011

(65) Prior Publication Data
US 2012/0267868 A1 Oct. 25, 2012

(30) Foreign Application Priority Data

Nov. 16, 2009 (DE) .......................... 10 2009 046 738

(51) Int. Cl.
*B62C 1/00* (2006.01)
*B25D 17/32* (2006.01)
*B62B 1/26* (2006.01)
*B62B 5/06* (2006.01)

(52) U.S. Cl.
CPC . *B62C 1/12* (2013.01); *B25D 17/32* (2013.01); *B62B 1/26* (2013.01); *B62B 5/067* (2013.01); *B62B 2202/48* (2013.01); *B62B 2205/12* (2013.01)

USPC ............................................. 280/63; 280/30

(58) Field of Classification Search
USPC ............ 280/47.26, 37, 30, 47.19, 654, 47.17, 280/63
See application file for complete search history.

(56) References Cited

U.S. PATENT DOCUMENTS

| 1,898,369 | A |   | 2/1933  | Hohmann et al. |
| 2,439,992 | A | * | 4/1948  | Simonian ....................... 280/37 |
| 3,279,348 | A | * | 10/1966 | Kinnard ..................... 280/47.17 |
| 4,247,130 | A | * | 1/1981  | Paterson ....................... 280/654 |
| 5,415,514 | A | * | 5/1995  | Butterfield .................... 414/403 |

(Continued)

FOREIGN PATENT DOCUMENTS

| CA | 2 038 108 A1 | 7/1992 |
| DE | 102006000105 | 9/2007 |

(Continued)

*Primary Examiner* — Hau Phan
(74) *Attorney, Agent, or Firm* — Davidson, Davidson & Kappel, LLC

(57) ABSTRACT

A transport cart for a pneumatic chisel hammer has two wheels, a protective cage and a holder. The protective cage has a flat base, a front side, a rear side and two flat leg sides, whereby at least one of the leg sides is at an angle between 60° and 80° relative to the base. The holder serves to secure the chisel hammer inside the protective cage. The user can pull the transport cart when it is upright on its base. The transport cart can be securely laid on its side on one of the leg sides in order to be stowed away. The slanting of the leg side enhances the stability by lowering the center of gravity.

7 Claims, 1 Drawing Sheet

(56) References Cited

U.S. PATENT DOCUMENTS

| | | | |
|---|---|---|---|
| 5,435,546 A * | 7/1995 | Rao | 280/40 |
| 5,462,127 A * | 10/1995 | Svensson | 173/162.2 |
| 5,632,496 A * | 5/1997 | Nelson | 280/30 |
| 6,763,940 B1 * | 7/2004 | Lai | 280/DIG. 6 |
| 6,820,879 B1 * | 11/2004 | Butterfield | 280/47.26 |
| 2002/0070518 A1 | 6/2002 | Peters | |
| 2007/0216077 A1 | 9/2007 | Keith et al. | |
| 2008/0224431 A1 | 9/2008 | Reinicke | |
| 2009/0243240 A1 * | 10/2009 | Boustred | 280/47.19 |
| 2009/0250889 A1 | 10/2009 | Palmore | |

FOREIGN PATENT DOCUMENTS

| | | |
|---|---|---|
| DE | 10 2007 000127 | 9/2008 |
| FR | 2 446 155 A1 | 8/1980 |
| GB | 746 292 | 3/1956 |
| GB | 1 221 358 A | 2/1971 |
| JP | 63 175684 | 11/1988 |

* cited by examiner

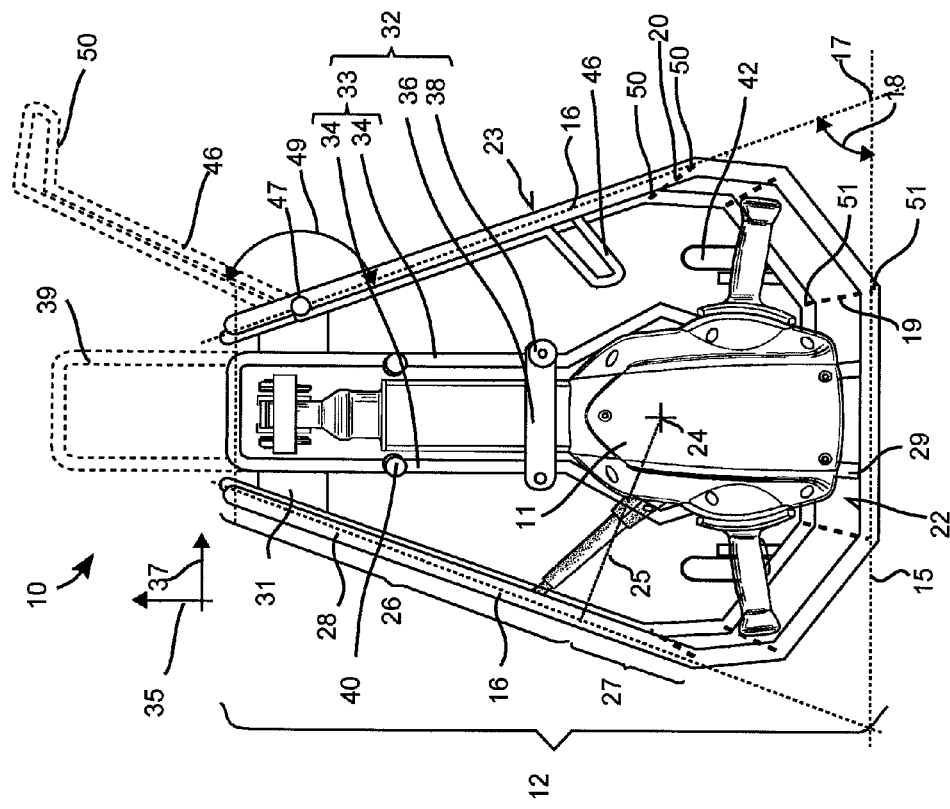

TRANSPORT CART

FIELD OF THE INVENTION

The present invention relates to a manual transport cart for handheld power tools. Heavy handheld chiseling power tools are difficult to carry because of their size and weight of, for example, between 10 kg and 15 kg.

BACKGROUND

U.S. Pat. No. 1,898,369 A describes a transport cart. The transport cart stands on two wheels. A pneumatic chisel hammer can be affixed to a holder. A user can push or pull the transport cart by means of two handles that are on the transport cart. A similar transport cart is disclosed in German laid-open document DE 10 2006 000 105 A1.

SUMMARY OF THE INVENTION

The transport cart itself is inconvenient. The transport cart can only be loaded into a vehicle when it is upright, otherwise the heavy chisel hammer has to be removed.

It is an object of the present invention to provide a transport cart for a handheld power tool that is more convenient for daily use.

The present invention provides a transport cart for a pneumatic chisel hammer has two wheels, a protective cage and a holder. The protective cage has a flat base, a front side, a rear side and two flat leg sides, whereby at least one of the leg sides is at an angle between 60° and 80° relative to the base. The holder serves to secure the chisel hammer inside the protective cage. The user can pull the transport cart when it is upright on its base. The transport cart can be securely laid on its side on one of the leg sides in order to be stowed away. The slanting of the leg side enhances the stability by lowering the center of gravity.

One basic shape of the protective cage can be a convex element, and a geometric body that circumscribes the base, the front side, the rear side and the leg sides is a straight prism having a trapezoidal base area or a pyramid. The front side and the rear side can be parallel to each other or can be positioned relative to each other at a slant of 80° at the maximum.

One embodiment provides that the transport cart has a center of gravity, and a plumb line on the at least one leg side running through the center of gravity divides the leg side in the longitudinal direction into a first section and a second section, and the lengths of the sections are at a ratio between 1/3 and 3. The leg side has a markedly larger dimension in a direction that defines the longitudinal direction.

One embodiment provides that the surface area of the at least one leg side is larger than the surface area of the base.

One embodiment provides that a swiveling arm is present on the at least one leg side, and said arm can be swiveled out of the leg side at an angle. The swiveling arm is especially helpful for loading the transport cart into a motor vehicle. The swiveling arm has a bent end. The swivel axis of the swiveling arm is preferably perpendicular to the axis of the wheels.

One embodiment provides that the wheels are mounted on wheel brackets that can be swiveled into the protective cage.

BRIEF DESCRIPTION OF THE DRAWINGS

The description below explains the invention on the basis of embodiments provided by way of example and on the basis of figures. The figures show the following:

FIG. 1: a three-dimensional view of a transport cart; and
FIG. 2: a side view of the transport cart.

Unless otherwise indicated, identical elements or elements having the same function are designated with the same reference numerals in the figures.

DETAILED DESCRIPTION

FIG. 1 shows a front view of a transport cart 10 by way of an example, in which a chisel hammer 11 is secured for the sake of illustration. During transportation, the chisel hammer 11 is protected against damage by a protective cage 12. The protective cage 12 is dimensioned in such a way that the chisel hammer 11, without tools, fits completely in the protective cage 12. For example, the protective cage 12 can be made of tubes or other hollow profiles.

The geometry of the protective cage 12 shown by way of an example corresponds essentially to a straight prism. The bases of the prism form a flat front side 13 and a flat rear side 14 which are congruent and parallel to each other. A basic shape of the front side 13 and rear side 14 is a trapeze having a base line 15 and two legs 16. One corner 50, 51 of the base line 15 with the legs 16 can be truncated, as depicted in FIG. 1. The angle 18 of the base line 15 with the legs 16 is within the range from 60° to 80°. Preferably, the trapeze is an isosceles trapeze, so that the two legs 16 are positioned at the same angle 18 with respect to the base line 15. Opposite corners 17 of the front side 13 and of the rear side 14 in a lateral surface define side edges 19, 20 that run along a first direction 21, that are parallel to each other and that are of equal length. The base lines 15 of the front side 13 and of the rear side 14 are laterally delimited by the first side edges 19 and they define a flat base 22, while the legs 16 and the second side edges 20 define leg surfaces 23. The base 22 and the leg surfaces 23 are both oriented along the first direction 21 and enclose the angle 18. A surface area of the leg surfaces 23 is at least as large as the surface area of the base 22.

The transport cart 10 can stand securely on the base 22. As an alternative, the transport cart 10 can be tilted with respect to the first direction 21 and laid onto the leg surface 23, where it then also stands securely. The latter position is intended for stowing the transport cart in the trunk of a conventional European passenger car. In the sideways position, the vertical dimension of the transport cart 10 is smaller. It should be pointed out that this also lowers the center of gravity 24 of the transport cart 10. The slanted leg surfaces 23 additionally assist in lowering the center of gravity 24 as compared to leg surfaces arranged at a right angle relative to the base 22.

A plumb line 25 on the leg 16 divides the leg 16 into an upper section 26 and a lower section 27. The ratio of the length of the upper section 26 to the length of the lower section 27 is, for example, between 1/2 and 5.

In another embodiment, the fundamental geometric shape of the protective cage 12 is a truncated prism. The front side and the rear side are slanted relative to each other at an angle between, for instance, 70° and 85°. The front side and/or the rear side are slanted with respect to the first direction 21. The side edges that connect corners of the front side and the rear side all run parallel to the first direction 21; in contrast to the embodiment shown in FIG. 1, they can be of different lengths. As in the preceding embodiment, the leg surfaces, that is to say, the side surfaces of the truncated prism that differ from the front side and the rear side, are at an angle between 60° and 80° relative to the base.

The front side 13 is delimited by a bent tube 28. The tube 28 can surround the front side 13 completely or else partially as depicted in FIG. 1. The rear side 14 is framed by a tube that is configured like the front side 13. The tubes 28 of the front and rear surfaces 13, 14 are joined to each other by means of cross struts 29. The cross struts 29 can be arranged, for example, in the base 22. At an upper end of the protective cage 12 located opposite from the base 22, there can also be cross struts 30. In the embodiment shown, the upper cross struts 30 are formed by the tube 28 that is bent parallel to the first direction 21 towards the rear side 14 and that is welded to the tube of the rear side 14. As an alternative, the front side 13 and the rear side 14 are bent out of the same tube 28. A plate 31 or another cross strut on the rear side 14 can join the two legs 16 to each other in order to ensure greater stiffness of the protective cage 12.

A holder 32 for the chisel hammer 11 is provided on the rear side 14. The holder 32 has a rod assembly 33 that is arranged in the plane of the rear side 14 or inside the protective cage 12 parallel to the rear side 14. The rod assembly 33 closes the rear side 14 in such a way that the chisel hammer 11 cannot fall out of the protective cage 12. In the embodiment of FIG. 1, the rod assembly 33 has essentially two rods 34 that are arranged symmetrically with respect to a second direction 35. The second direction is perpendicular to the base 22. A swiveling bar 36 is arranged on the rod assembly 33. The bar 36 is oriented parallel to a third direction 37, perpendicular to the first direction 21 and to the second direction 35. The bar 36 is bent in the first direction 21 and can grip around a neck of the chisel hammer 11 on one side. A screwed connection 38 or a hook closure allows users to lock and unlock the bar 36 in order to secure the chisel hammer 11 in the transport cart 10.

A handle 39 can be connected to the rod assembly 33. In a preferred embodiment, the handle 39 can be telescopically sunk into the rod assembly 33 until it lies completely inside the protective cage 12. In this manner, the dimensions of the transport cart 10 can be reduced so that it can be stowed away. Moreover, the protective cage 12 protects the handle 39 against damage.

Projections 40 positioned parallel to the first direction 21 can be provided on the rod assembly 33, and they serve to additionally secure the chisel hammer 11 to the bar 36.

The front side 13 is open and has only the externally delimiting frame through the tube 24. Users can place the chisel hammer 11 into the holder 32 through the open front side 13.

The transport cart 10 has two wheels 42 or castors. The axes 43 of the wheels 42 are parallel to the third direction 37. The distance between the wheels 42 preferably amounts to at least 75% of the maximum dimension of the protective cage in the third direction 37, as a result of which the transport cart 10 can be pulled without wobbling. The wheels 42 are mounted on the protective cage 12 by means of swiveling wheel brackets 44. In a first position, the wheel brackets 44 are folded open. The wheels 42 project out of the protective cage 12 and the transport cart 10 can be moved by being tilted around an axis 45 of the wheels 42. Unintentional rolling of the transport cart 10 is prevented in that the wheels 42 in the first position are at a distance of a few centimeters from the plane of the base 22. As long as the transport cart 10 is standing on the base 22, the wheels 42 hover a bit above the ground. In a second position of the wheel bracket 44 (shown by a broken line in FIG. 2), the wheels 42 are arranged inside the protective cage 12 and are protected against damage. In an alternative embodiment, the axes 43 of the wheels 42 are parallel to the first direction 21.

A swiveling arm 46 is provided on a leg surface 23. A swivel axis 47 is in the area of an upper end 48 of the protective cage 12. In a first position, the swiveling arm 46 is completely inside the protective cage 12, for example, in the plane of the leg surface 23. The swiveling arm 46 can be swiveled out to a second position in which it is at an angle 49 between 120° and 150° relative to the leg surface 23. A blocking element prevents the swiveling arm 46 from being swiveled out any further. The swiveling arm 46 can consist of a U-shaped bent tube. The swiveling arm 46 comes into action when the transport cart 10 is loaded into the trunk of a typical European passenger car. The transport cart 10 is placed with the leg surface 23 facing the trunk of the car. The swiveling arm 46 is swiveled out and projects into the trunk. When the transport cart 10 is lifted, it can then be supported on the swiveling arm 46 and slid into the trunk on the swiveling arm 46.

In a preferred embodiment, an end 50 of the swiveling arm 46 that is distal from the swivel axis 47 is angled with respect to the first direction 21. The length of the distal end 50 amounts to about 5 cm to 10 cm, corresponding to a typical loading edge of the trunk.

In another embodiment, the base lines 15 and the legs 16 are configured so as to be straight. Sections of the tube 28 that connect the base line 15 to the leg 16 in the front side 13 or rear side 14 can be configured so as to be bent, for instance, without corners. The truncated corner shown in FIG. 1 and having two partial sections 51, 52 could be divided into a larger number of sections. The length of the base 22 and of the leg sides 23 is defined by the straight sections of the base line 15 or of the legs 16.

What is claimed is:

1. A transport cart for a pneumatic chisel hammer, comprising:
   two wheels;
   a protective cage having a flat base, a front side, a rear side and two leg sides, at least one of the leg sides being flat and at an angle between 60° and 80° relative to the base; and
   a holder to secure the chisel hammer inside the protective cage,
   the protective cage being a convex element and a geometric body circumscribing the base, the front side, the rear side and the leg sides to define a straight prism having a trapezoidal surface area or a pyramid, and
   a swiveling arm on the at least one leg side, the arm swivelable at an angle out of the leg side.

2. The transport cart as recited in claim 1 wherein the front side and the rear side are parallel to each other or are positioned relative to each other at a slant of 80° at the maximum.

3. The transport cart as recited in claim 1 wherein the transport cart has a center of gravity and a plumb line on the at least one leg side running through the center of gravity dividing the at least one leg side in the longitudinal direction into a first section and a second section, the lengths of the first and second sections being at a ratio between 1/3 and 3.

4. The transport cart as recited in claim 1 wherein the surface area of the at least one leg side is larger than the surface area of the base.

5. The transport cart as recited in claim 1 wherein the swiveling arm has a bent end.

6. The transport cart as recited in claim 1 wherein an axle of the wheels is perpendicular to the swivel axis of the swiveling arm.

7. The transport cart as recited in claim 1 wherein the wheels are mounted on wheel brackets swivelable into the protective cage.

* * * * *